US008887772B2

(12) United States Patent
Na et al.

(10) Patent No.: US 8,887,772 B2
(45) Date of Patent: Nov. 18, 2014

(54) FUEL INJECTION APPARATUS, FUEL INJECTION SYSTEM AND FUEL INJECTION METHOD

(75) Inventors: Young-Seung Na, Yongin-si (KR); Jung-Kurn Park, Yongin-si (KR); Hye-Jung Cho, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 417 days.

(21) Appl. No.: 13/250,687

(22) Filed: Sep. 30, 2011

(65) Prior Publication Data

US 2012/0175011 A1    Jul. 12, 2012

Related U.S. Application Data

(60) Provisional application No. 61/432,145, filed on Jan. 12, 2011.

(51) Int. Cl.
*B65B 1/30* (2006.01)
*F17C 1/00* (2006.01)

(52) U.S. Cl.
CPC . *F17C 1/00* (2013.01); *Y02E 60/523* (2013.01)
USPC ............. 141/95; 141/2; 141/21; 141/67

(58) Field of Classification Search
USPC ........ 141/2, 18, 21, 59, 67, 95; 429/512, 513, 429/515
See application file for complete search history.

(56) References Cited

U.S. PATENT DOCUMENTS

| | | | | |
|---|---|---|---|---|
| 3,946,572 | A | * | 3/1976 | Bragg ........................... 62/50.1 |
| 4,275,860 | A | * | 6/1981 | Brabazon ................. 244/135 R |
| 4,585,039 | A | * | 4/1986 | Hamilton ........................ 141/47 |
| 5,360,139 | A | * | 11/1994 | Goode ............................ 222/40 |
| 5,411,374 | A | * | 5/1995 | Gram ............................. 417/53 |
| 6,162,555 | A | * | 12/2000 | Gutierrez et al. ............. 429/404 |
| 6,722,399 | B1 | * | 4/2004 | Cano ............................. 141/67 |
| 7,037,609 | B2 | * | 5/2006 | Sugawara et al. ............ 429/415 |
| D574,767 | S | | 8/2008 | Hall et al. |
| 7,546,744 | B2 | * | 6/2009 | Harper et al. ................. 62/45.1 |
| 7,591,288 | B2 | * | 9/2009 | Bitoh ............................. 141/59 |
| 7,788,048 | B2 | | 8/2010 | Thielman et al. |
| 8,555,672 | B2 | * | 10/2013 | Turner et al. ................... 62/613 |
| 2007/0068596 | A1 | | 3/2007 | Corless et al. |
| 2012/0012225 | A1 | * | 1/2012 | Moszkowski et al. ........... 141/4 |

FOREIGN PATENT DOCUMENTS

| | | |
|---|---|---|
| JP | 2008-192508 A | 8/2008 |
| JP | 2009-224121 A | 10/2009 |
| KR | 10-2004-0093022 A | 11/2004 |

* cited by examiner

*Primary Examiner* — Timothy L Maust
(74) *Attorney, Agent, or Firm* — Knobbe, Martens, Olson & Bear LLP

(57) ABSTRACT

Disclosed herein is a fuel injection apparatus for injecting fuel into a fuel cartridge. The fuel injection apparatus may include, for example, a container for fuel storage, a fuel supply pipe in fluid communication with the container, a first valve installed on the fuel supply pipe, a pump installed on the fuel supply pipe, a pressure gauge installed on the fuel supply pipe, and a bypass pipe fluidly connecting the container with the fuel supply pipe. A second valve may be installed on the bypass pipe. Methods for injecting fuel into a fuel cartridge are also disclosed herein.

13 Claims, 12 Drawing Sheets

FUEL INJECTION APPARATUS, FUEL INJECTION SYSTEM AND FUEL INJECTION METHOD

CROSS-REFERENCE TO RELATED APPLICATION

This is a non-provisional application claiming the benefit of and priority to U.S. Provisional Application No. 61/432,145, filed Jan. 12, 2011, the entire contents of which are hereby incorporated by reference.

BACKGROUND

1. Field

The described technology relates generally to a fuel injection apparatus and a fuel injection method and, more particularly, to an apparatus for injecting fuel into a cartridge for a fuel battery and a fuel injection method using the same.

2. Description of the Related Technology

A fuel cell is a device for electrochemically producing power by using fuel (hydrogen or reformed gas) and an oxidizing agent (oxygen or air). The fuel cell directly converts the fuel and the oxidizing agent into electrical energy through an electrochemical reaction. The fuel may be pure hydrogen or hydrocarbon-based fuel (such as LNG, LPG, or $CH_3OH$). The oxidizing agent of the fuel cell may be oxygen or air containing a large amount of pure oxygen.

Different types of fuel cells include a polymer electrolyte membrane fuel cell (PEMFC), a direct oxidation fuel cell, and the like. A fuel cell using methanol as fuel, one of the direct oxidation fuel cells, is called a direct methanol fuel cell (DMFC). The direct oxidation fuel cell directly supplies fuel such as methanol, or the like, to a fuel cell stack to produce power according to a reaction between the fuel and an oxidizing agent. In the case of a small fuel cell, the DMFC supplies fuel to the fuel cell stack through a fuel cartridge. When the fuel stored in the fuel cartridge is used up, fuel is again injected to the fuel cartridge using a fuel injection device. Fuel injection devices measure the weight of the fuel cartridge, and thus, measure the amount of the fuel remaining in the fuel cartridge, and then replenish the fuel cartridge with fuel. With this method, however, the user must always measure both the weight of the empty cartridge and the remaining fuel amount, which is inconvenient to the user.

Also, when methanol stored in a container is exhausted, air is likely to be introduced. Because the weight of air is not measured, more fuel is "replenished" than is needed and the cartridge may be damaged through a continuous pumping operation. Further, when air is introduced into the interior of the fuel cartridge, there is no method for eliminating air, making it impossible to both accurately and completely fill the fuel cartridge with fuel. In addition, when air present in the interior of the fuel cartridge is supplied to the fuel cell stack, a phenomenon in which an anode is rapidly oxidized or density is not controlled occurs.

SUMMARY OF CERTAIN INVENTIVE ASPECTS

The described technology has been made in an effort to provide a fuel injecting apparatus and a fuel injecting method having advantages of easily injecting fuel.

In one aspect, a fuel injection apparatus includes, for example, a container for fuel storage, a fuel supply pipe in fluid communication with the container, a first valve installed on the fuel supply pipe, a pump installed on the fuel supply pipe, a pressure gauge installed on the fuel supply pipe, and a bypass pipe fluidly connecting the container with the fuel supply pipe.

In some embodiments, a second valve is installed on the bypass pipe. In some embodiments, the bypass pipe fluidly connects to the fuel supply pipe at a point between the first valve and the pump. In some embodiments, the pressure gauge is installed on the fuel supply pipe at a point between the first valve and the pump. In some embodiments, the container is fluidly connected to a ventilation pipe. In some embodiments, the container is fluidly connected to a buffering container via a connection pipe. In some embodiments, a second pump is installed on the connection pipe. In some embodiments, the connection pipe is fluidly connected to the fuel supply pipe via a control valve. In some embodiments, the control valve includes, for example, a three-way valve. In some embodiments, the buffering container is fluidly connected to a ventilation pipe. In some embodiments, the fuel supply pipe is in fluid communication with the container via a buffering container and a connection pipe.

In another aspect, a fuel injection system includes, for example, a fuel cartridge in fluid communication with a fuel injection apparatus.

In another aspect, a fuel injection apparatus includes, for example, a container for fuel storage, a fuel supply pipe in fluid communication with the container, a first valve installed on the fuel supply pipe, a pump installed on the fuel supply pipe, a pressure gauge installed on the fuel supply pipe, and a bypass pipe fluidly connecting the container with the fuel supply pipe.

In some embodiments, the bypass pipe fluidly connects to the fuel supply pipe via the first valve. In some embodiments, the first valve includes, for example, a three-way valve. In some embodiments, the container is fluidly connected to a buffering container via a connection pipe. In some embodiments, a second pump is installed on the connection pipe. In some embodiments, the connection pipe is fluidly connected to the fuel supply pipe via a control valve. In some embodiments, the control valve includes, for example, a three-way valve.

In another aspect, a method of injecting fuel is provided. The method may include, for example, providing a fuel injection system, eliminating fuel remaining in a fuel cartridge, eliminating air in a fuel supply pipe, and injecting fuel from a container to the fuel cartridge.

In some embodiments, a first valve and a pump are installed on the fuel supply pipe. In some embodiments, the fuel injection apparatus includes, for example, a bypass pipe in fluid communication with the container and the fuel supply pipe at a point between the first valve and the pump. In some embodiments, the bypass pipe includes, for example, a second valve. In some embodiments, eliminating fuel remaining in the fuel cartridge includes, for example, shutting the second valve, opening the first valve and using the pump to pump air and fuel remaining in the interior of the fuel cartridge to the container through the fuel supply pipe. In some embodiments, eliminating air in the fuel supply pipe includes, for example, shutting the first valve, opening the second valve, and using the pump to inject fuel from the container to the supply pipe via the bypass pipe. In some embodiments, injecting fuel from the container to the fuel cartridge includes, for example, shutting the second valve, opening the first valve, and using the pump to pump fuel from the container to the fuel cartridge. In some embodiments, the fuel supply pipe includes, for example, a pressure gauge. In some embodiments, eliminating fuel remaining in the cartridge includes, for example, discharging fuel remaining in the fuel cartridge and monitoring a first pressure comparison. In some embodiments, the fuel supply pipe includes, for example, a pressure gauge. In some embodiments, eliminating fuel remaining in the cartridge further includes, for example, comparing a discharge pressure between the pump and the fuel cartridge with a pre-set first reference pressure, performing pumping when the discharge pressure is higher than the first reference pressure, and stopping pumping when the discharge pressure is lower than the first reference pressure. In some embodiments, injecting fuel from the container to the fuel cartridge includes, for example, supplying fuel from the container to the fuel cartridge and monitoring a second pressure comparison. In some embodiments, injecting fuel from the container to the fuel cartridge further includes, for example, comparing an injection pressure between the pump and the fuel cartridge with a pre-set second reference pressure, performing pumping when the injection pressure is lower than the second reference pressure, and stopping pumping when the injection pressure is higher than the second reference pressure.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
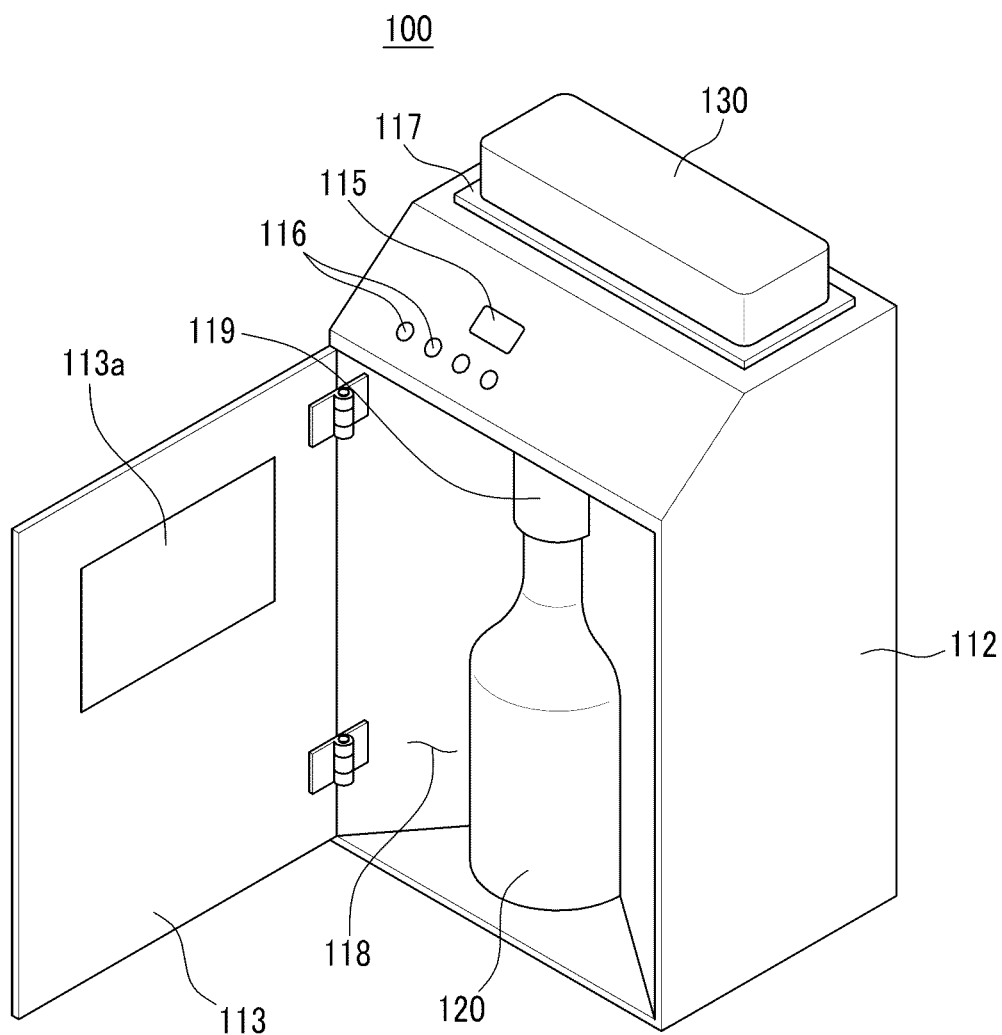
FIG. 1 is a perspective view of a fuel injection apparatus according to a first embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Since the disclosure may be modified in various ways and have various embodiments, the disclosure will be described in detail with reference to the drawings. However, it should be understood that the disclosure is not limited to a specific embodiment but includes all changes and equivalent arrangements and substitutions included in the spirit and scope of the disclosure. In the following description, if the detailed description of the already known structure and operation may confuse the subject matter of the present disclosure, the detailed description thereof will be omitted.

While such terms as "first," "second," etc., may be used to describe various components, such components must not be limited to the above terms. The above terms are used only to distinguish one component from another. Terms used in the following description are to describe specific embodiments and is not intended to limit the disclosure. The expression of singularity includes plurality meaning unless the singularity expression is explicitly different in context. It should be understood that the terms "comprising," "having," "including," and "containing" are to indicate features, numbers, steps, operations, elements, parts, and/or combinations but not to exclude one or more features, numbers, steps, operations, elements, parts, and/or combinations or additional possibilities.

Figure 2:
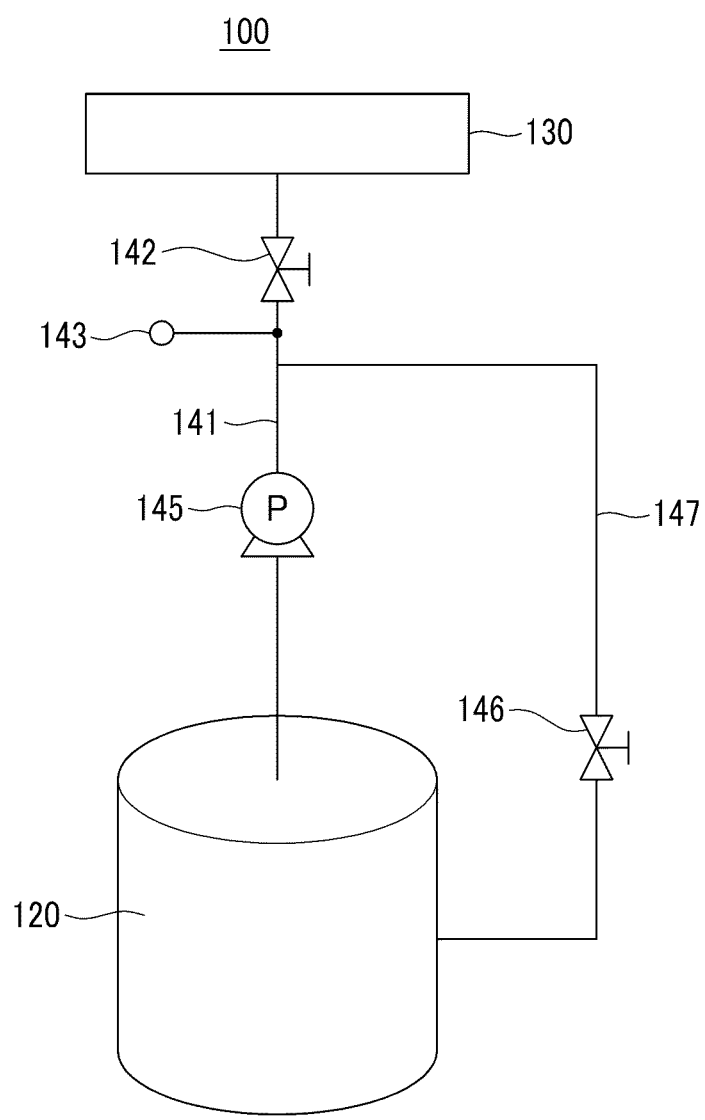
FIG. 2 is a schematic view of the fuel injection apparatus according to the first embodiment.

FIG. 1 is a perspective view of a fuel injection apparatus according to a first embodiment, and FIG. 2 is a schematic view of the fuel injection apparatus according to the first embodiment.

With reference to FIGS. 1 and 2, a fuel injection apparatus 100 according to the first embodiment is an apparatus for injecting fuel into a fuel cartridge 130 for a fuel cell. Here, the fuel may include various types of hydrocarbon-based fuel, such as methanol, ethanol, and the like. The fuel injection apparatus 100 includes a case 112 constituting an external appearance, a mounting part 117 coupled to the fuel cartridge 130, a container 120 storing fuel, an accommodation part 118 accommodating fuel, and a cover 113 for opening and closing the accommodation part 118. The fuel injection apparatus 100 includes a fuel supply pipe 141 fluidly connecting the container 120 and the fuel cartridge 130, a bypass pipe 147 in fluid communication with the container 120 and the fuel supply pipe 141, and a pump 145 configured for fluid connection to the fuel supply pipe 141.

The fuel cartridge 130, having a substantially rectangular shape, includes a fuel pouch (not shown) positioned therein. Fuel may be stored in the fuel pouch. However, the present disclosure is not limited thereto, and the fuel injection apparatus 100 according to the present embodiment may be applicable to fuel cartridges having various shapes such as a cylindrical shape, and the like.

The case 112, which is formed of various materials such as a synthetic resin, metal, and the like, and constitutes an external appearance of the fuel injection apparatus 100, accommodates various pipes and valves therein. The mounting part 117 is positioned on an upper end portion of the case 112 to fluidly connect the fuel supply pipe 141 and the fuel cartridge 130 and has a terminal coupled to the fuel cartridge 130.

The container 120 is mounted in the accommodation part 118 and has a bottle-like shape having a cross section narrowing toward an entrance formed at an upper end thereof. The container 120 is fluidly connected to the fuel supply pipe 141 through a container fixing part 119 coupled to the upper end thereof.

The cover 113 is configured to open and close the accommodation part 118. The cover 113 includes a transparent window 113*a* configured to allow for checking of the amount of fuel stored in the container 120.

Operation buttons 116 are installed on the case 112 and are configured to allow a user to input a command such as start, end, or the like, to drive the fuel injection apparatus 100. Also, a display unit 115 is installed on the case 112. The display unit 115 is configured as an LCD or an LED to display an operational situation of the fuel injection apparatus 100.

As shown in FIG. 2, the fuel supply pipe 141, which fluidly connects the container 120 and the fuel cartridge 130, may be configured as a single pipe or may have a structure in which a plurality of pipes are fluidly connected. The pump 145 for moving fuel is installed on the fuel supply pipe 141. The pump 145 may be configured as a volumetric pump. Accordingly, a pre-set amount of fuel may be easily delivered to the fuel cartridge 130 through the pump 145. Also, a first valve 142 is installed on the fuel supply pipe 141 to control the fluid connection between the fuel cartridge 130 and the container 120. A pressure gauge 143 configured for measuring pressure in the interior of the fuel supply pipe may be installed between the first valve 142 and the pump 145. The pressure gauge 143 may be fluidly connected to the fuel supply pipe 141 and configured to measure pressure acting on the fuel cartridge 130 by the pump 145. The installation of the pressure gauge 143 according to the first embodiment may be configured to prevent an excessive pressure from acting on the fuel cartridge 130 by the pump 145.

The bypass pipe 147, which fluidly connects the container 120 and the fuel supply pipe 141, is fluidly connected to the fuel supply pipe 141 between the pump 145 and the first valve 142. Accordingly, when the first valve 142 is shut, fuel introduced to the fuel supply pipe 141 through the bypass pipe 147 may not move to the fuel cartridge 130, but instead, is diverted to the container 120. A second valve 146 may be installed on the bypass pipe 147 to control switching of the bypass pipe 147. The second valve 146 may be shut when fuel is discharged or injected through the fuel supply pipe 141, and opened only when fuel is supplied to the fuel supply pipe 141 through the bypass pipe 147.

Figure 3:
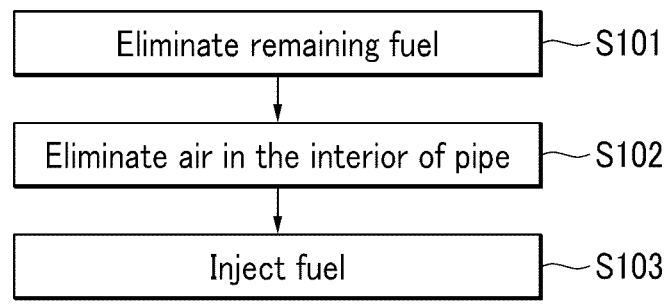
FIG. 3 is a flow chart illustrating the process of a fuel injection method according to the first embodiment.
Figure 4A:
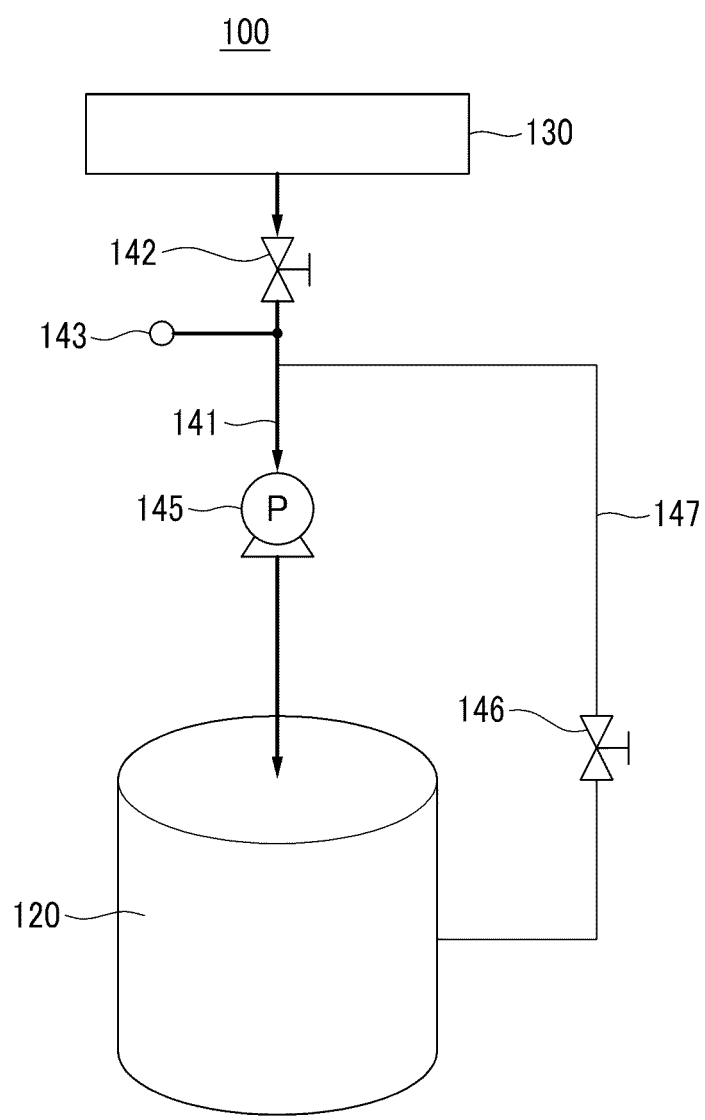
FIG. 4A is a view illustrating a step of eliminating remaining fuel by using the fuel injection apparatus according to the first embodiment.
Figure 4B:
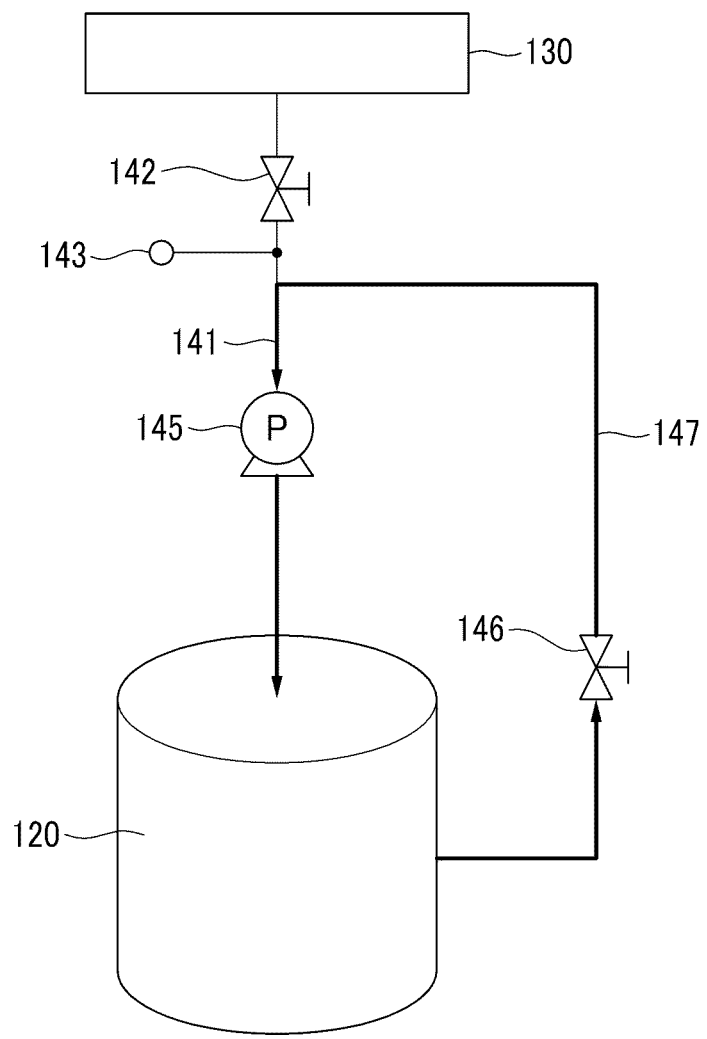
FIG. 4B is a view illustrating a step of eliminating air in the interior of a fuel supply pipe by using the fuel injection apparatus according to the first embodiment.
Figure 4C:
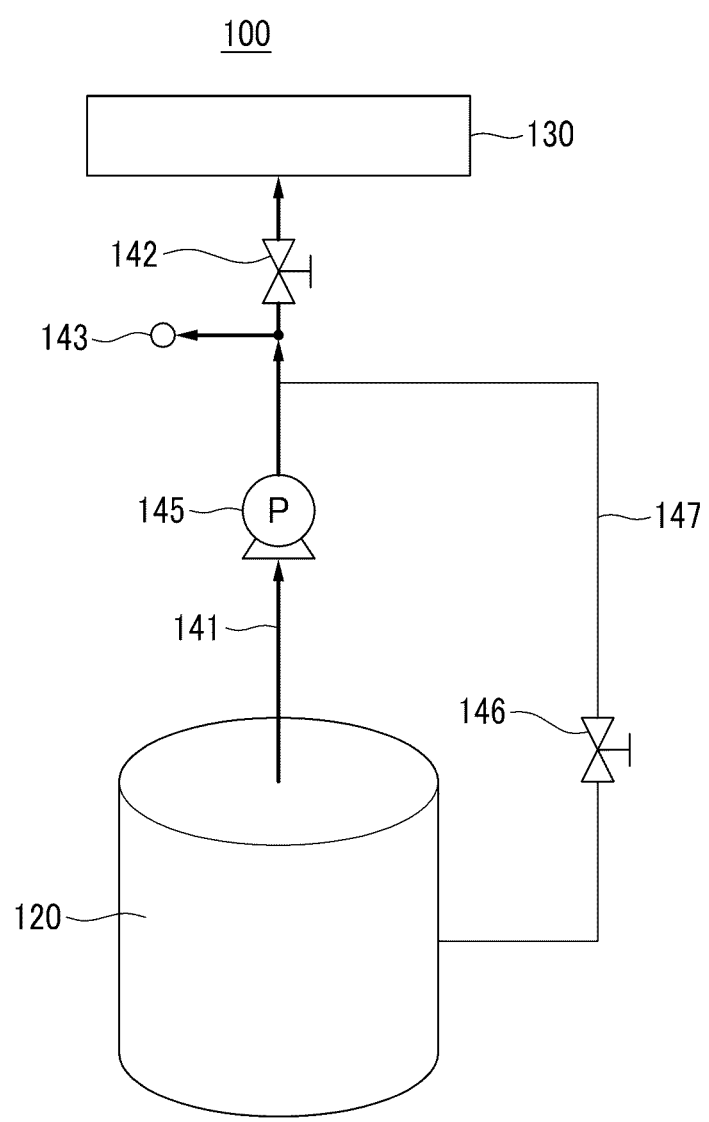
FIG. 4C is a view illustrating a step of injecting fuel by using the fuel injection apparatus according to the first embodiment.

FIG. 3 is a flow chart illustrating the process of a fuel injection method according to the first embodiment. FIG. 4A is a view illustrating a step of eliminating remaining fuel by using the fuel injection apparatus according to the first embodiment. FIG. 4B is a view illustrating a step of eliminating air in the interior of a fuel supply pipe by using the fuel injection apparatus according to the first embodiment. FIG. 4C is a view illustrating a step of injecting fuel by using the fuel injection apparatus according to the first embodiment.

With reference to FIGS. 3 and 4A to 4C, the fuel injection method according to the first embodiment includes a remaining fuel elimination step (S101) for discharging fuel remaining in the fuel cartridge 130, a pipe interior air elimination step (S102) for eliminating air remaining in the interior of the fuel supply pipe 141, and a fuel injection step (S103) for moving the fuel stored in the container 120 to the fuel cartridge 130 through the fuel supply pipe 141.

As shown in FIG. 4A, in the remaining fuel elimination step (S101), in a state in which the second valve 146 is shut and the first valve 142 is open, air and fuel remaining in the interior of the fuel cartridge 130 is facilitated in moving to the container 120 through the fuel supply pipe 141 by using the pump 145. In this case, air, as well as the fuel remaining in the interior of the fuel cartridge 130, is also discharged through the fuel supply pipe 141. An operation capacity of the pump 145, which is configured as a volumetric pump, is previously set to discharge sufficient fuel and air.

A problem occurs when a large a volume of fuel cannot be accommodated in the container 120 within the cartridge 130. This problem may arise when fuel is first discharged from the container 120. That is, when the container 120 is used for charging the cartridge 130 once or more, a sufficient extra space can be formed in the container 120, but at the initial stage, the container 120 is full of fuel, so there may not be a sufficient extra space therein. However, the cartridge 130 is fluidly connected to the fuel injection apparatus 100 in a state in which the fuel within the cartridge 130 is exhausted. Thus, remaining fuel can be introduced into an internal extra space of the container 120 (not shown).

As shown in FIG. 4B, the pipe interior air elimination step (S102) is a step of eliminating air which has been introduced into the interior of the fuel supply pipe 141 in the process of discharging the fuel and air in the interior of the fuel cartridge 130. In the pipe interior air elimination step (S102), the first valve 142 is shut and the second valve 146 is open to prevent fluid connection between the fuel cartridge 130 and the container 120 and also to fluidly connect the bypass pipe 147 and the fuel supply pipe 141. In this state, fuel is injected to the fuel supply pipe 141 through the bypass pipe 147 using the pump 145. The fuel is introduced into the fuel supply pipe 141 from the container 120 and the bypass pipe 147, and air previously introduced into the fuel supply pipe 141 is then pushed by the fuel into the container 120.

As shown in FIG. 4C, in the fuel injection step (S103), the second valve 146 is shut and the first valve 142 is open to prevent fluid connection between the bypass pipe 147 and the container 120 and connect to the fuel cartridge 130 and the container 120. In this state, the fuel is moved from the container 120 to the fuel cartridge 130 using the pump 145.

That is, as discussed above with regard to FIGS. 4A, 4B and 4C, air in the interior of the fuel supply pipe 141 is moved to the container 120 so as to be eliminated. Further, air remaining in the interior of the fuel supply pipe 141 may thus be prevented from being introduced into the fuel cartridge 130 in the process of injecting the fuel into the fuel cartridge 130. A small amount of air may exist in the pipe between the first valve 142 and the cartridge 130, but in this case, the length of the pipe fluidly connecting the cartridge 130 and the first valve 142 may be formed to be as short as possible so that residual air is minimized. Thus, any residual air would be so small an amount so as not to negatively affect the cartridge 130 and the fuel cell stack if it were then introduced into the cartridge 130.

When air of a certain amount or more is introduced into the interior of the fuel cartridge 130, it moves to one or more fuel cell stacks to cause a phenomenon in which an anode is rapidly oxidized or density is not controlled. Such a phenomenon may become severe in case of a fuel cell, such as a portable fuel cell, which does not have an installation directionality. However, according to the present embodiment, because the air of the fuel supply pipe 141, as well as the air in the interior of the fuel cartridge 130, is discharged to minimize introduction of air in the interior of the fuel cartridge 130.

The remaining fuel elimination step (S101), the pipe interior air elimination step (S102), and the fuel injection step (S103) are automatically performed by pressing a start button among the operation buttons 116 illustrated in FIG. 1. Accordingly, all the steps can be automatically executed according to the setting, and the user does not need to take a measure for eliminating the remaining fuel and the air in the interior of the fuel pipe.

Figure 5:
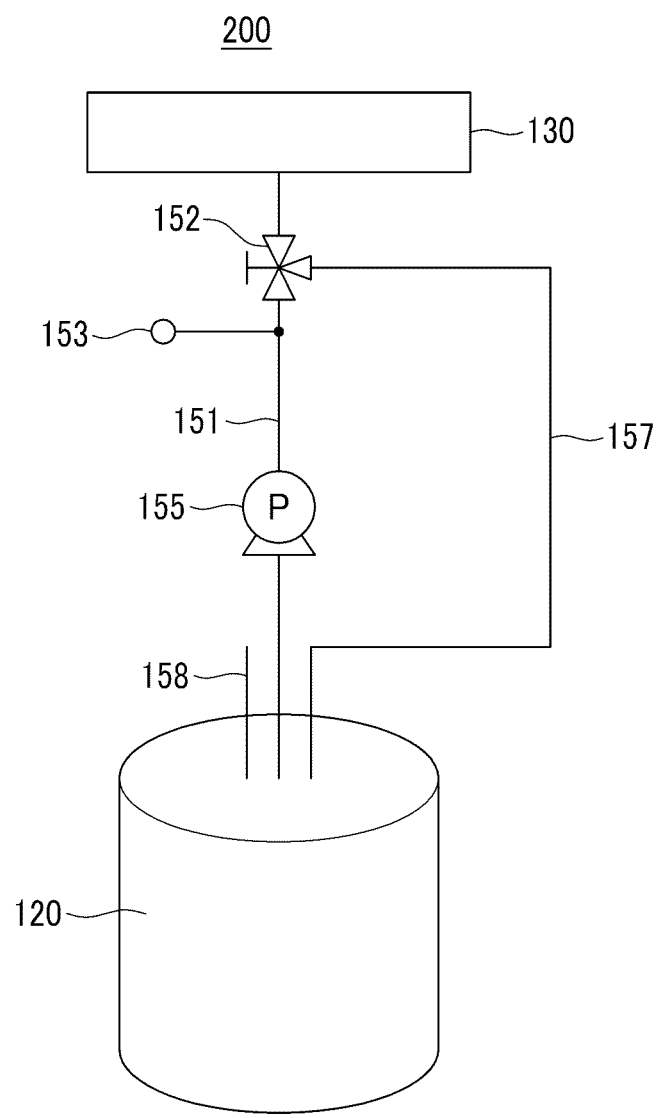
FIG. 5 is a schematic view of a fuel injection apparatus according to a second embodiment.

FIG. 5 is a schematic view of a fuel injection apparatus according to a second embodiment. With reference to FIG. 5, a fuel injection apparatus 200 according to the second embodiment includes the container 120 storing fuel, a fuel supply pipe 151 fluidly connecting the container 120 and the fuel cartridge 130, a bypass pipe 157 fluidly connected to the container 120 and a fuel supply pipe 151, a pump 155 installed to be fluidly connected to the fuel supply pipe 151, and a 3-way valve 152 fluidly connecting the fuel supply pipe 151 and the bypass pipe 157.

The fuel supply pipe 151 fluidly connects the container 120 and the fuel cartridge 130. The fuel supply pipe 151 may be configured as a single pipe or may have a structure in which a plurality of pipes is fluidly connected. The pump 155 for moving fuel is installed at the fuel supply pipe 151, and in this case, the pump 155 may be configured as a volumetric pump. Accordingly, a pre-set amount of fuel may be easily delivered to the fuel cartridge through the pump 155.

A pressure gauge 153 configured for measuring the pressure in the interior of the fuel supply pipe 151 is installed between the 3-way valve 152 and the pump 155. The pressure gauge 153 is installed to be fluidly connected to the fuel supply pipe 151 and may be configured to measure the pressure acting on the fuel cartridge 130 by the pump 155. The installation of the pressure gauge 153 according to the present embodiment may prevent an excessive pressure from being applied to the fuel cartridge 130 due to the pump 155.

The bypass pipe 157 fluidly connects the container 120 and the fuel supply pipe 151 and is fluidly connected to the fuel supply pipe 151 by the medium of the 3-way valve 152. One end portion of the bypass pipe 157 is installed to be fluidly connected to the 3-way valve 152, and the other end portion of the bypass pipe 157 is installed to be fluidly connected to an entrance formed at an upper end of the container.

Meanwhile, a ventilation pipe 158 is installed at the container 120 to allow air to be introduced into or discharged from the interior of the container 120. The ventilation pipe 158 is configured as a short pipe that does not contact the fuel. When the fuel is discharged from the container 120, the ventilation pipe 158 allows external air to be introduced therethrough, and when air or fuel is introduced into the container 120 through the fuel supply pipe 151, the ventilation pipe 158 allows air in the interior of the container 120 to be discharged therethrough.

The 3-way valve 152 is configured to control a fluid connection (or fluid communication) between the fuel supply pipe 151 and 157 as well as a fluid connection between the fuel cartridge 130 and the container 120.

A method for injecting fuel using the fuel injection apparatus 200 will now be described. The method includes a remaining fuel elimination step discharging fuel remaining in the fuel cartridge 130, a pipe interior air elimination step eliminating air remaining in the interior of the fuel supply pipe 151, and a fuel injection step moving the fuel stored in the container 120 to the fuel cartridge 130 through the fuel supply pipe 151. In this case, the respective steps are controlled by the 3-way valve 152.

In the remaining fuel elimination step, the 3-way valve 152 blocks (or cuts off) fluid communication between the fuel supply pipe 151 and the bypass pipe 157 and fluidly connects the fuel cartridge 130 and the container 120. In this state, air and fuel remaining in the interior of the fuel cartridge 130 are moved to the container 120 through the fuel supply pipe 151. In this case, air, as well as the fuel remaining in the interior of the fuel cartridge 130, is also discharged through the fuel supply pipe 151.

In the pipe interior air elimination step, the 3-way valve 152 blocks the fluid connection between the fuel cartridge 130 and the container 120 and fluidly connects the bypass pipe 157 and the fuel supply pipe 151. In this state, fuel is injected into the fuel supply pipe 151 through the bypass pipe 157 using the pump 155.

The fuel is introduced into the fuel supply pipe 151 through the container 120 and the bypass pipe 157, and air introduced into the fuel supply pipe 151 is pushed by the fuel so as to be retrieved into the container 120.

In the fuel injection step, in a state in which the 3-way valve 152 blocks the fluid connection between the bypass pipe 157 and the container 120 and fluidly connects the fuel cartridge 130 and the container 120, fuel is moved from the container 120 to the fuel cartridge 130 by using the pump 155.

In this manner, according to the present embodiment, because all the steps may be controlled by using the single 3-way valve 152, the respective steps may be easily controlled and the volume of the fuel injection apparatus may be reduced.

Figure 6:
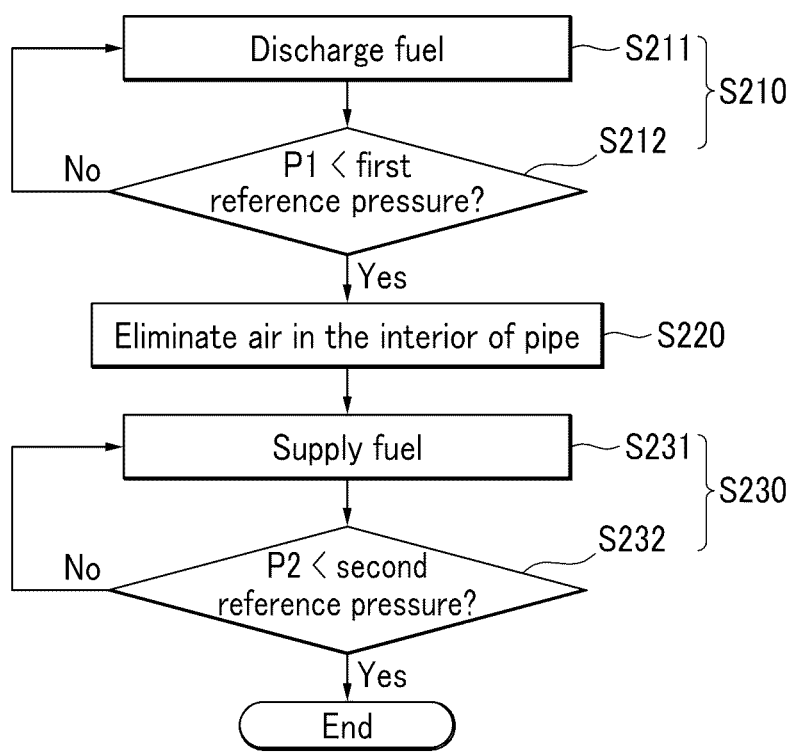
FIG. 6 is a flow chart illustrating the process of a fuel injection method according to a third embodiment.

FIG. 6 is a flow chart illustrating the process of a fuel injection method according to a third embodiment. A fuel injection method is performed using a fuel injection apparatus having the same or similar structure as that of the first embodiment. With reference to FIGS. 2 and 6, the fuel injection method according to the present embodiment includes a remaining fuel elimination step (S210) discharging fuel remaining in the fuel cartridge 130, a pipe interior air elimination step (S220) eliminating air remaining in the interior of the fuel supply pipe 141, and a fuel injection step (S230) moving the fuel stored in the container 120 to the fuel cartridge 130 through the fuel supply pipe 141.

The remaining fuel elimination step (S210) includes a fuel discharge step (S211) moving air and fuel remaining in the interior of the fuel cartridge 130 to the container 120 using the pump 145 installed on and fluidly connected to the fuel supply pipe 141. The fuel elimination step also includes a first pressure comparison step (S212) comparing a discharge pressure P1 between the pump 145 and the fuel cartridge 130 with a pre-set first reference pressure, and performing pumping when the discharge pressure P1 is higher than the first reference pressure, and stopping pumping when the discharge pressure P1 is lower than the first reference pressure.

In the first pressure comparison step (S212), when the pumping operation is performed, the discharge pressure P1 at the fuel supply pipe 141 positioned between the pump 145 and the fuel cartridge 130 is measured. When the discharge pressure P1 at the fuel supply pipe 141 is higher than the pre-set first reference pressure, pumping is continuously performed to eliminate the fuel and air in the interior of the fuel cartridge 130, and when the discharge pressure P1 at the fuel supply pipe 141 is lower than the pre-set first reference pressure, because it means that the fuel and air in the interior of the fuel cartridge 130 have been completely eliminated, the pumping operation is stopped. The first reference pressure is used to check whether or not the fuel and air in the interior of the fuel cartridge 130 are controlled, which may be set to variably range depending on the size, structure, and durability of the fuel cartridge 130.

In general, a pouch for storing fuel is installed in the interior of the fuel cartridge 130, which is configured to suppress generation of a great acoustic pressure in the process of eliminating the fuel and air. However, when the fuel cartridge 130 is relatively large, a comparably larger pressure may be applied to reliably eliminate fuel and air.

The pipe interior air elimination step S220 is performed to eliminate air introduced into the interior of the fuel supply pipe 141 in the process of discharging fuel and air from the interior of the fuel cartridge 130. In the pipe interior air elimination step S220, in a state in which a fluid connection between the fuel cartridge 130 and the container 120 is blocked and the bypass pipe 147, which is fluidly connected to the container 120 and the fuel supply pipe 141, and the fuel supply pipe 141 are fluidly connected, fuel is injected to the fuel supply pipe 141 through the bypass pipe 147. The fuel is introduced into the fuel supply pipe 141 through the container 120 and the bypass pipe 147, and air remaining in the interior of the fuel supply pipe 141 is pushed by the fuel, and thus, moved to the container 120. Accordingly, air remaining in the interior of the fuel supply pipe 141 may be prevented from being introduced into the fuel cartridge in the process of injecting fuel into the fuel cartridge 130.

In the fuel injection step (S230), in a state in which a fluid connection between the bypass pipe 147 and the container 120 is blocked and the fuel cartridge 130 and the container 120 are fluidly connected, fuel is moved from the container 120 to the fuel cartridge 130. The fuel injection step (S230) includes a fuel supply step (S231) of moving fuel from the container 120 to the fuel cartridge 130 by using the pump 145 installed to be fluidly connected to the fuel supply pipe 141 and a second pressure comparison step (S232) of comparing an injection pressure P2 between the pump 145 and the fuel cartridge 130 with a pre-set second reference pressure, and performing pumping when the injection pressure P2 is lower than the second reference pressure, and stopping pumping when the injection pressure P2 is higher than the second reference pressure.

In the second pressure comparison step (S232), when the pumping operation is performed, the pressure at the fuel supply pipe 141 positioned between the pump 145 and the fuel cartridge 130 is measured. When the injection pressure P2 of the fuel supply pipe 141 is lower than the pre-set second reference pressure, pumping may be continuously performed to continuously supply fuel to the interior of the fuel cartridge 130. When the injection pressure P2 at the fuel supply pipe 141 is higher than the pre-set second reference pressure, because the interior of the fuel cartridge 130 is sufficiently filled with fuel, the supply of fuel is stopped. The second reference pressure may be used to check whether or not the interior of the fuel cartridge 130 is sufficiently filled with fuel, which may be set to variably range depending on the size, structure, and durability of the fuel cartridge 130.

Figure 7:
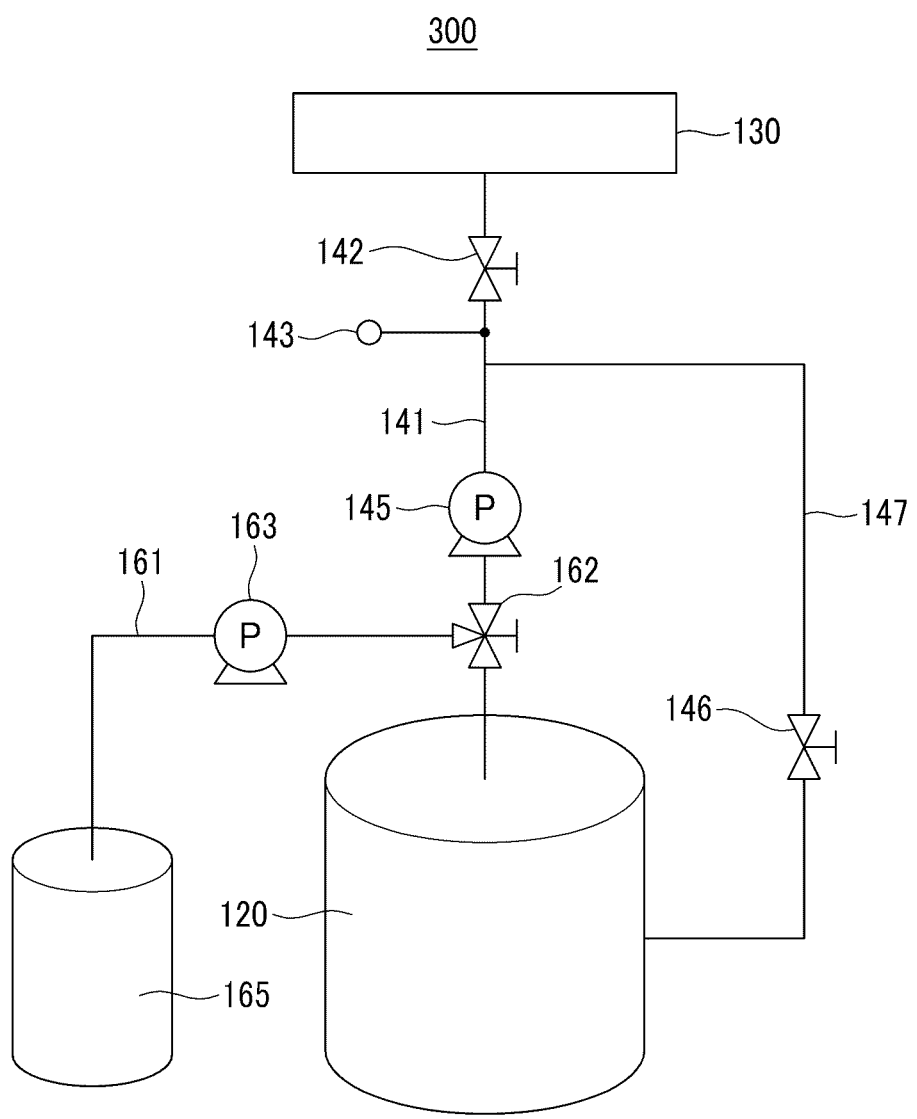
FIG. 7 is a schematic view of a fuel injection apparatus according to a fourth embodiment.

FIG. 7 is a fuel injection apparatus according to a fourth embodiment. Referring to FIG. 7, a fuel injection apparatus 300 according to the present embodiment includes a container 120 storing fuel, a fuel supply pipe 141 fluidly connecting the container 120 and a fuel cartridge 130, a bypass pipe 147 fluidly connected to the fuel supply pipe 141, a pump 145 fluidly connected to the fuel supply pipe 141, a first valve 142 installed in the fuel supply pipe 141, a second valve 146 installed to be fluidly connected to the bypass pipe 147, and a buffering container 165 installed to be fluidly connected to the fuel supply pipe 141. The fuel injection apparatus 300 according to the present embodiment has a similar structure to that of the fuel injection apparatus of the first embodiment, excluding the buffering container 165 and a configuration related thereto, and therefore a description of the same parts will not be provided.

The buffering container 165 is installed to be fluidly connected to the fuel supply pipe 141 through a connection pipe 161. A pump 163 is installed on and in fluid communication with the connection pipe 161. In addition, the connection pipe 161 is installed to be fluidly connected to the fuel supply pipe 141 through a control valve 162, and thus, the control valve 162 may be formed as a tri-directional valve so that the buffering container 165, the cartridge 130, or the container 120 can be selectively fluidly connected to the control valve 162.

A discharge button may be additionally provided for the case that a user wants to charge much more fuel in the cartridge 130 even though the cartridge 130 has already been filled with a large amount of fuel. When the user presses the discharge button, the control valve 162 fluidly connects the fuel supply pipe 141 and the connection pipe 161 and disconnects the container 120 from the fuel supply pipe 141 to move fuel discharged from the cartridge 130 to the buffering container 165.

When the excessive amount of fuel stored in the cartridge 130 moves to the container 120, the fuel may overflow if a sufficient space does not remain in the container 120. However, when the buffering container 165 is provided as in the present embodiment, the overflow of the fuel in the container 120 can be prevented by discharging the fuel to the buffering container 165 having an empty space.

The user may fill the cartridge 130 up with fuel for a trip and the like even though the fuel in the cartridge 130 is not exhausted. In this case, the cartridge 130 may be charged after discharging the fuel remaining in the cartridge 130 to the buffering container 165.

The fuel may be discharged to the buffering container 165 and air in the fuel supply pipe 141 may be eliminated, and then the control valve 162 is controller such that the container 120 and the cartridge 130 are fluidly connected. In this condition, the fuel stored in the container 120 is moved to the cartridge 130 to charge the same by using the pump 145.

When charging of the cartridge 130 is finished, the buffering container 165 and the container 120 are fluidly connected by controlling the control valve 162 to move the fuel in the buffering container 165 to the container 120 using the pump 163. When the charging of the cartridge 130 is finished, fuel is discharged from the container 120 so that a sufficient space is formed in the container 120, and therefore the overflow does not occur in the container 120 even through the fuel stored in the buffering container 165 is moved to the container 120.

Figure 8:
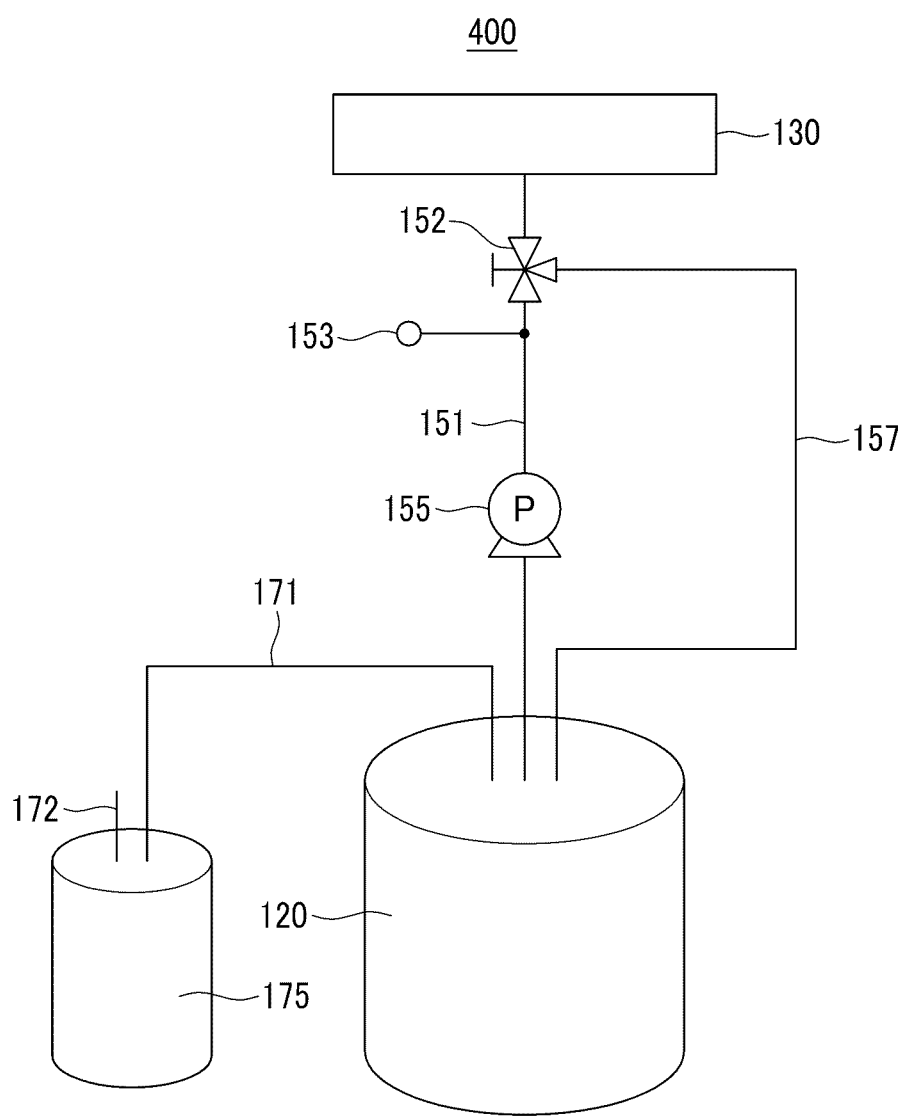
FIG. 8 is a schematic view of a fuel injection apparatus according to a fifth embodiment.

FIG. 8 is a fuel injection apparatus according to a fifth embodiment. Referring to FIG. 8, a fuel injection apparatus 400 according to the present embodiment includes a container 120 storing fuel, a fuel supply pipe 151 fluidly connecting the container 120 and a fuel cartridge 130, a bypass pipe 157 fluidly connected to the container 120 and the fuel supply pipe 151, a pump 155 installed to be fluidly connected to the fuel supply pipe 151, a tri-directional valve 152 fluidly connecting the fuel supply pipe 151 and the bypass pipe 157, and a buffering container 175 installed to be fluidly connected to the fuel supply pipe 151. The fuel supply pipe 400 according to the present embodiment has a similar structure to that of the fuel injection apparatus of the second embodiment, excluding the buffering container 175 and a configuration related thereto, and therefore a description of the same parts will not be provided.

The buffering container 175 is installed to be fluidly connected to the container 120 through a connection pipe 171, and a ventilation tube 172 is installed at the buffering container 175 to allow air to be introduced into or discharged from the interior of the buffering container 175. The connection pipe 171 is configured to function to move the fuel discharged from the container 120 to the buffering container 175 when the amount of fuel injected to the container 120 is greater than a remaining space of the container 120. The ventilation tube 172 is configured to introduce external air when the fuel is discharged from the buffering container 175, and discharges internal air of the buffering container 175 when the fuel is injected to the buffering container 175. When the fuel is supplied to the cartridge 130 through the container 120, internal pressure of the container 120 may be decreased so that the fuel or air in the buffering container 175 moves to the container 120 through the connection pipe 171. Accordingly, the fuel stored in the buffering container 175 may be moved to the container 120 without installing an additional pump.

Figure 9:
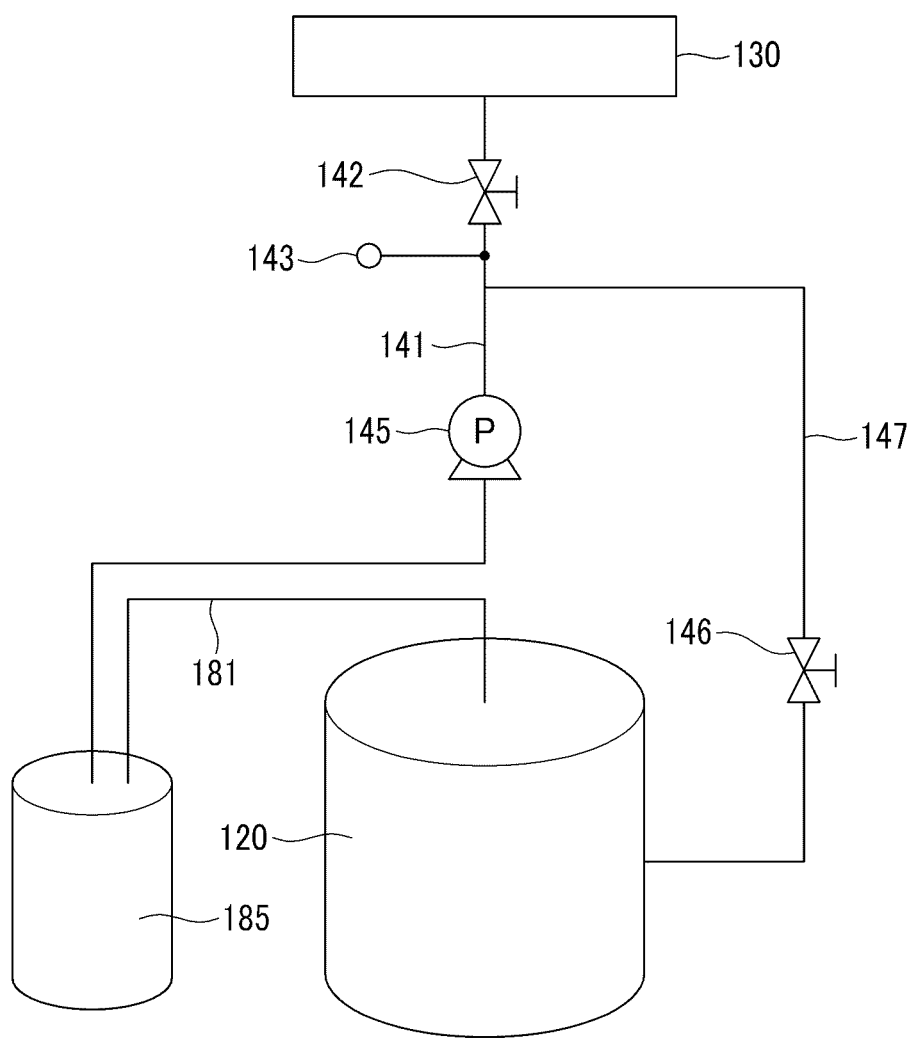
FIG. 9 is a schematic view of a fuel injection apparatus according to a sixth embodiment.

FIG. 9 is a schematic view of a fuel injection apparatus according to a sixth embodiment. Referring to FIG. 9, a fuel injection apparatus 500 includes a container 120 storing fuel, a buffering container 185 installed to be fluidly connected through a connection pipe 181 to the container 120, a fuel supply pipe 141 fluidly connecting the buffering container 185 and a fuel cartridge 130, a bypass pipe 147 fluidly connected to the container 120 and the fuel supply pipe 141, a pump 145 installed to be fluidly connected to the fuel supply pipe 141, a first valve 142 installed in the fuel supply pipe 141, and a second valve 146 installed to be fluidly connected to the bypass pipe 147. The fuel injection apparatus 500 according to the present embodiment has a similar structure to that of the fuel injection apparatus of the first embodiment, excluding the buffering container 185 and a configuration related thereto, and therefore a description for the same parts will not be provided.

The fuel supply pipe 141 is installed to be in direct fluid communication with the buffering container 185. The buffering container 185 is fluidly connected with the container 120 through the connection pipe 181. The connection pipe 181 is configured to move fuel to the container 120 from the buffering container 185 when there is more fuel than space remaining in the buffering container 185. The connection pipe 181 is also configured to move fuel stored in the container 120 to the buffering container 185 when supplying fuel to the cartridge 130.

When the fuel is discharged from the cartridge 130, the fuel is moved to the buffering container 185 through the fuel supply pipe 141. The buffering container 185 may be empty at the initial stage so that the buffering container 185 may contain a sufficient amount of fuel discharged from the cartridge 130. Accordingly, overflow of fuel in the container 120 can be prevented even when no additional space remains in the container 120.

When fuel is supplied to the cartridge 130 after the air in the fuel supply pipe 141 is removed, the fuel stored in the buffering container 185 may be moved to the cartridge 130 through the fuel supply pipe 141. In this case, the pressure in the buffering container 185 is decreased so that the fuel stored in the container 120 moves to the buffering container 185 through the connection pipe 181, thereby continuously supplying fuel to the buffering container 185.

Figure 10:
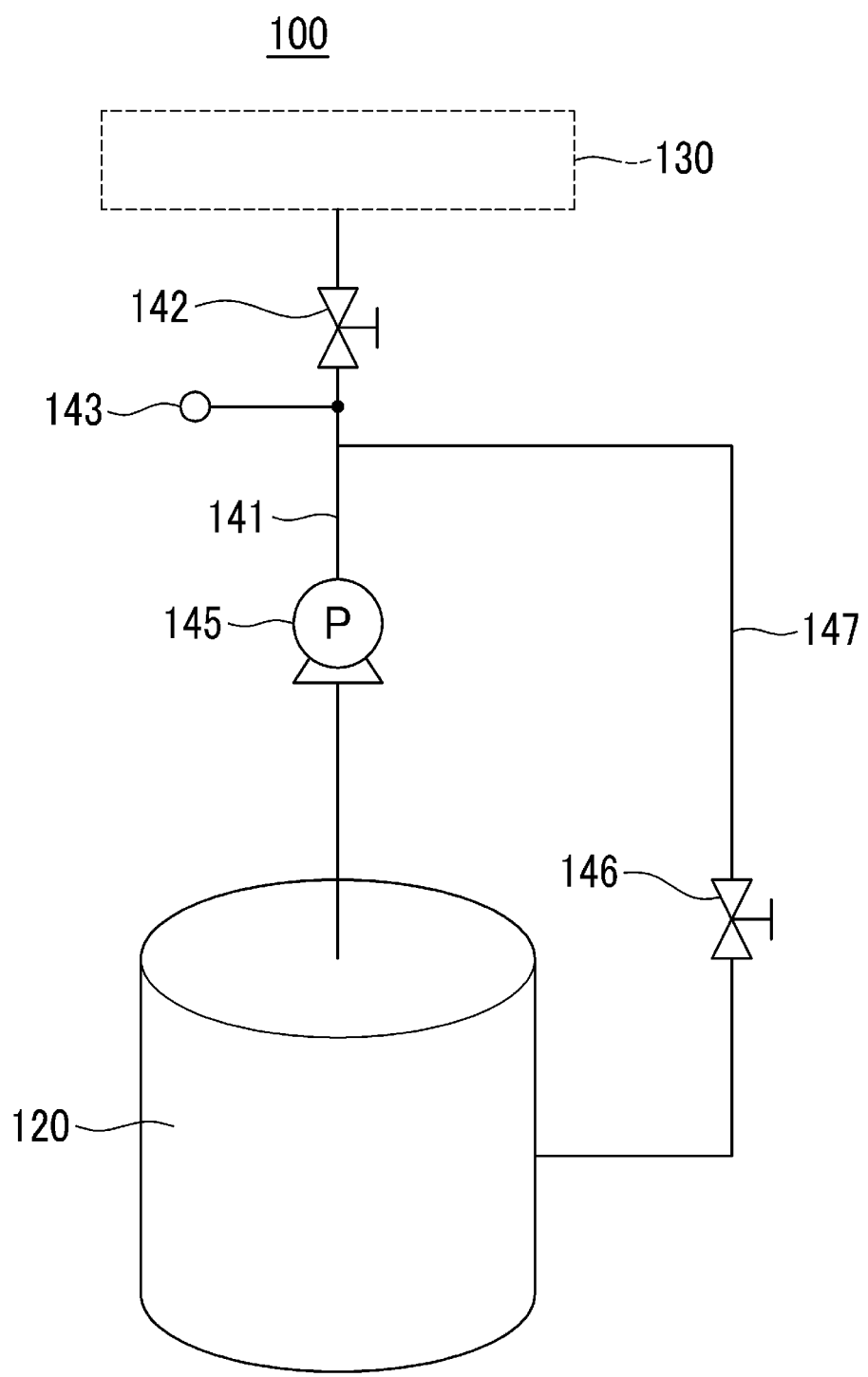
FIG. 10 is a fuel injection apparatus according to another embodiment.

FIG. 10 is a fuel injection apparatus according to another embodiment. The fuel injection apparatus of FIG. 10 does not include a fuel cartridge. As illustrated in FIG. 10, the location for a possible connection of a fuel cartridge 130 is depicted with dashed lines.

While the present invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel injection apparatus, comprising:
   a container for fuel storage;
   a fuel supply pipe in fluid communication with the container;
   a first valve installed on the fuel supply pipe;
   a pump installed on the fuel supply pipe between the container and the first valve;
   a pressure gauge installed on the fuel supply pipe between the first valve and the pump; and
   a bypass pipe fluidly connecting the container with the fuel supply pipe,
   wherein a second valve is installed on the bypass pipe,
   wherein the container is fluidly connected to a buffering container via a connection pipe, and
   wherein a second pump is installed on the connection pipe.

2. The fuel injection apparatus of claim 1, wherein the bypass pipe fluidly connects to the fuel supply pipe at a point between the first valve and the pump.

3. The fuel injection apparatus of claim 1, wherein the connection pipe is fluidly connected to the fuel supply pipe via a control valve.

4. The fuel injection apparatus of claim 3, wherein the control valve comprises a three-way valve.

5. A fuel injection system, comprising the fuel injection apparatus of claim 1 and further comprising a fuel cartridge in fluid communication with the fuel injection apparatus.

6. A method of injecting fuel, the method comprising:
   providing the fuel injection system of claim 5;
   eliminating fuel remaining in the fuel cartridge;
   eliminating air in the fuel supply pipe; and
   injecting fuel from the container to the fuel cartridge.

7. The method of injecting fuel of claim 6, wherein eliminating fuel remaining in the fuel cartridge comprises shutting the second valve, opening the first valve and using the pump to pump air and fuel remaining in the interior of the fuel cartridge to the container through the fuel supply pipe.

8. The method of claim 7, wherein eliminating air in the fuel supply pipe comprises shutting the first valve, opening the second valve, and using the pump to inject fuel from the container to the supply pipe via the bypass pipe.

9. The method of claim 8, wherein injecting fuel from the container to the fuel cartridge comprises shutting the second valve, opening the first valve, and using the pump to pump fuel from the container to the fuel cartridge.

10. The method of injecting fuel of claim 6, wherein eliminating fuel remaining in the cartridge comprises discharging fuel remaining in the fuel cartridge and monitoring a first pressure comparison.

11. The method of injecting fuel of claim 10, wherein eliminating fuel remaining in the cartridge further comprises comparing a discharge pressure between the pump and the fuel cartridge with a pre-set first reference pressure, performing pumping when the discharge pressure is higher than the first reference pressure, and stopping pumping when the discharge pressure is lower than the first reference pressure.

12. The method of injecting fuel of claim 10, wherein injecting fuel from the container to the fuel cartridge comprises supplying fuel from the container to the fuel cartridge and monitoring a second pressure comparison.

13. The method of injecting fuel of claim 12, wherein injecting fuel from the container to the fuel cartridge further comprises comparing an injection pressure between the pump and the fuel cartridge with a pre-set second reference pressure, performing pumping when the injection pressure is lower than the second reference pressure, and stopping pumping when the injection pressure is higher than the second reference pressure.

* * * * *